(12) United States Patent
Ryu et al.

(10) Patent No.: US 12,019,319 B2
(45) Date of Patent: Jun. 25, 2024

(54) OPTICAL PATH CONTROL MEMBER AND DISPLAY DEVICE COMPRISING SAME

(71) Applicant: LG INNOTEK CO., LTD., Seoul (KR)

(72) Inventors: Soo Jy Ryu, Seoul (KR); Jun Sik Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 426 days.

(21) Appl. No.: 17/594,821

(22) PCT Filed: Jul. 21, 2020

(86) PCT No.: PCT/KR2020/009594
§ 371 (c)(1),
(2) Date: Oct. 29, 2021

(87) PCT Pub. No.: WO2021/020795
PCT Pub. Date: Feb. 4, 2021

(65) Prior Publication Data
US 2022/0214570 A1   Jul. 7, 2022

(30) Foreign Application Priority Data
Jul. 30, 2019   (KR) .................. 10-2019-0092493

(51) Int. Cl.
*G02F 1/1676*   (2019.01)
*G02F 1/13*   (2006.01)
(Continued)

(52) U.S. Cl.
CPC ............ *G02F 1/1323* (2013.01); *G02F 1/167* (2013.01); *G02F 1/1676* (2019.01);
(Continued)

(58) Field of Classification Search
CPC .... G02F 1/167; G02F 2202/28; G02F 1/1339; G02F 1/1681; G02F 1/1679;
(Continued)

(56) References Cited

U.S. PATENT DOCUMENTS 10,308,844 B2   6/2019   Higashi et al.
2003/0025855 A1   2/2003   Holman et al.
(Continued)

FOREIGN PATENT DOCUMENTS

KR   10-2007-0001717 A   1/2007
KR   10-2014-0031920 A   3/2014
(Continued)

OTHER PUBLICATIONS

Supplementary European Search Report dated Jul. 5, 2023 in European Application No. 20847542.6.
(Continued)

*Primary Examiner* — Brandi N Thomas
(74) *Attorney, Agent, or Firm* — Saliwanchik, Lloyd & Eisenschenk

(57) ABSTRACT

An optical path control member according to an embodiment comprises: a lower substrate; a lower electrode disposed on the upper surface of the lower substrate; an upper substrate disposed on the lower substrate; an upper electrode disposed on the lower surface of the upper substrate; a light conversion unit disposed between the lower electrode and the upper electrode; and an adhesive layer provided between the light conversion unit and the upper electrode, wherein the light conversion unit includes partition wall parts and accommodation parts that are alternately disposed, the accommodation part has a light transmission rate that varies according to the application of voltage, and, when the ratio of the thickness of the accommodation part to the dielectric constant thereof (thickness/dielectric constant) is defined as A and the ratio of the thickness of the adhesive layer to the dielectric constant thereof (thickness/dielectric constant) is defined as B, the value of A is greater than the value of B.

17 Claims, 15 Drawing Sheets

(51) Int. Cl.
*G02F 1/167* (2019.01)
*G02F 1/1681* (2019.01)
*G02F 1/1685* (2019.01)

(52) U.S. Cl.
CPC .......... *G02F 1/1681* (2019.01); *G02F 1/1685* (2019.01); *G02F 2202/28* (2013.01); *G02F 2203/01* (2013.01)

(58) Field of Classification Search
CPC ............. G02F 1/134309; G02F 1/1323; G02F 1/1341; G02F 1/13439; G02F 1/1677; G02F 1/133528; G02F 1/1337; G02F 1/1675; G02F 1/1676; G02F 1/1334; G02F 1/1333; G02F 1/133305; G02F 1/13338; G02F 1/1335; G02F 1/133502; G02F 1/13454; G02F 1/13475; G02F 1/1368; G02F 1/13306; G02F 1/13394; G02F 1/13452; G02F 1/16757; G02F 1/13331; G02F 1/13456; G02F 1/1362; G02F 1/137; G02F 1/13737; G02F 2001/1678; G02F 2201/38; G02F 1/13; G02F 1/133345; G02F 1/133377; G02F 1/133512; G02F 1/13398; G02F 1/13613; G02F 1/13725; G02F 1/1397; G02F 2413/00; G02F 1/13345; G02F 1/13392; G02F 1/13706; G02F 1/16756; G02F 1/1685; G02F 2201/44; G02F 2202/022; G02F 1/133357; G02F 1/133509; G02F 1/133531; G02F 1/133603; G02F 1/13363; G02F 1/133707; G02F 1/134636; G02F 1/1351; G02F 1/136213; G02F 1/13718; G02F 1/1395; G02F 1/1396; G02F 1/16755; G02F 1/16762; G02F 2001/1635; G02F 2201/50; G02F 2202/043; G02F 2202/36; G02F 2202/42; G02F 2203/34; G02F 1/00; G02F 1/0018; G02F 1/0072; G02F 1/0102; G02F 1/0128; G02F 1/0131; G02F 1/061; G02F 1/065; G02F 1/1316; G02F 1/133; G02F 1/133302; G02F 1/133308; G02F 1/133311; G02F 1/133348; G02F 1/13336; G02F 1/133365; G02F 1/133371; G02F 1/133514; G02F 1/133519; G02F 1/133524; G02F 1/13356; G02F 1/1336; G02F 1/133602; G02F 1/133608; G02F 1/133614; G02F 1/133617; G02F 1/133637; G02F 1/133723; G02F 1/133742; G02F 1/133773; G02F 1/13378; G02F 1/33784; G02F 1/133788; G02F 1/133792; G02F 1/13396; G02F 1/13458; G02F 1/1347; G02F 1/13471; G02F 1/13473; G02F 1/135; G02F 1/136209; G02F 1/136222; G02F 1/136286; G02F 1/1375; G02F 1/13775; G02F 1/139; G02F 1/1506; G02F 1/1533; G02F 1/155; G02F 1/157; G02F 1/163; G02F 1/1671; G02F 1/172; G02F 1/225; G02F 1/29; G02F 1/292; G02F 1/294; G02F 2201/07; G02F 2201/08; G02F 2201/122; G02F 2201/14; G02F 2201/34; G02F 2201/42; G02F 2201/48; G02F 2201/56; G02F 2202/16; G02F 2203/01; G02F 2203/03; G02F 2203/64; G02B 26/08; G02B 1/118; G02B 1/14; G02B 5/3033; G02B 2207/123; G02B 5/003; G02B 5/20; G02B 5/3083; G02B 27/0172; G02B 30/27; G02B 30/31; G02B 5/1809; G02B 2027/0178; G02B 26/026; G02B 26/0875; G02B 3/14; G02B 5/201; G02B 5/223; G02B 5/24; G02B 5/3016; G02B 5/3025; G02B 1/002; G02B 1/04; G02B 1/041; G02B 1/111; G02B 1/16; G02B 2027/0134; G02B 2207/101; G02B 2207/107; G02B 26/00; G02B 26/005; G02B 26/02; G02B 26/023; G02B 27/017; G02B 27/0176; G02B 27/10; G02B 3/00; G02B 3/0012; G02B 3/0056; G02B 3/0075; G02B 3/0087; G02B 3/08; G02B 3/12; G02B 30/25; G02B 30/28; G02B 5/0215; G02B 5/045; G02B 5/08; G02B 5/1847; G02B 5/23; G02B 5/30; G02B 6/0026; G02B 6/122; G02B 6/1221; G02B 6/124; G02B 7/00; G02B 7/04; H10K 50/11; H10K 2101/10; H10K 85/342; H10K 50/8426; H10K 85/6572; H10K 50/844; H10K 50/82; H10K 2102/311; H10K 71/80; H10K 59/1201; H10K 77/111; H10K 50/805; H10K 50/86; H10K 59/131; H10K 71/00; H10K 85/654; H10K 2101/103; H10K 50/858; H10K 59/12; H10K 59/122; H10K 59/38; H10K 50/16; H10K 59/123; H10K 50/15; H10K 50/17; H10K 50/81; H10K 50/854; H10K 2102/3031; H10K 50/171; H10K 50/84; H10K 85/626; H10K 50/125; H10K 50/18; H10K 59/00; H10K 59/1213; H10K 59/35; H10K 71/50; H10K 50/818; H10K 50/852; H10K 59/126; H10K 59/30; H10K 59/40; H10K 85/324; H10K 85/346; H10K 85/657; H10K 85/6576; H10K 2102/351; H10K 50/00; H10K 50/131; H10K 50/165; H10K 50/19; H10K 50/822; H10K 50/824; H10K 50/828; H10K 50/8445; H10K 50/865; H10K 59/121; H10K 59/32; H10K 59/351; H10K 59/50; H10K 59/88; H10K 85/40; H10K 85/633; H10K 50/155; H10K 50/156; H10K 50/80; H10K 50/841; H10K 50/8423; H10K 50/856; H10K 59/8722; H10K 59/8791; H10K 71/60; H10K 85/622; H10K 85/631; H10K 2101/30; H10K 2102/3026; H10K 59/124; H10K 59/1275; H10K 59/1315; H10K 59/80522; H10K 59/80524; H10K 59/879; H10K 77/10; H10K 85/1135; H10K 85/636; H10K 2101/00; H10K 2101/27; H10K 2101/40; H10K 2101/90; H10K 2102/3023; H10K 2102/331; H10K 30/82; H10K 30/821; H10K 30/83; H10K 30/88; H10K 50/813; H10K 50/814; H10K 80/816; H10K 50/8428; H10K 50/546; H10K 50/85; H10K 59/127; H10K 59/128; H10K 59/353; H10K 59/86; H10K 59/87; H10K 59/871; H10K 59/8721; H10K 59/873; H10K 59/8731; H10K 59/877; H10K 59/8792; H10K 71/166; H10K 71/40; H10K 77/00; H10K 85/361
See application file for complete search history.

(56) References Cited

U.S. PATENT DOCUMENTS

2013/0293944 A1* 11/2013 Hayashi ............... G02F 1/167
156/146
2015/0168747 A1  6/2015 Kadono et al.
2018/0299688 A1  10/2018 Kubota et al.

FOREIGN PATENT DOCUMENTS

| KR | 10-2015-0125051 A | 11/2015 |
| KR | 10-2016-0084749 A | 7/2016 |
| KR | 10-2018-0004879 A | 1/2018 |
| KR | 10-2018-0066061 A | 6/2018 |
| KR | 10-2019-0026502 A | 3/2019 |

OTHER PUBLICATIONS

International Search Report dated Nov. 5, 2020 in International Application No. PCT/KR2020/009594.

* cited by examiner

C : ELECTRIC CAPACITY     ε : DIELECTRIC CONSTANT
A : AREA OF ONE CONDUCTIVE PLATE
d : DISTANCE BETWEEN CONDUCTIVE PLATES
V : VOLTAGE           Q : ELECTRIC CHARGE

C : ELECTRIC CAPACITY   ε : DIELECTRIC CONSTANT
A : AREA OF ONE CONDUCTIVE PLATE
d : DISTANCE BETWEEN CONDUCTIVE PLATES
V : VOLTAGE             Q : ELECTRIC CHARGE

LIGHT BLOCKING MODE

OPEN MODE

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2020/009594, filed Jul. 21, 2020, which claims the benefit under 35 U.S.C. § 119 of Korean Application No. 10-2019-0092493, filed Jul. 30, 2019, the disclosures of each of which are incorporated herein by reference in their entirety.

TECHNICAL FIELD

An embodiment provides an optical path control member having improved driving characteristics by controlling a thickness and dielectric constant of an adhesive layer between a pattern layer and an electrode layer.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may control the movement path of light, block light in a specific direction, and transmit light in a specific direction.

Meanwhile, such a light-shielding film may be applied to a display device such as a navigation device or a vehicle dashboard in a movement means such as a vehicle. That is, the light-shielding film may be applied to various fields in accordance with various purposes.

In addition, the light-shielding film may be used in various environments of the user. For example, the light-shielding film may be used during the day or night, and may be applied in various environments, such as when the user requires a specific viewing angle or improved visibility.

However, since light transmittance of a light blocking pattern of the light-shielding film is fixed, the user may be restricted in using the light-shielding film in various environments.

Therefore, there is a need for an optical path control member having a new structure that may be applied in various use environments.

DISCLOSURE

Technical Problem

An embodiment provides an optical path control member that is driven in another mode according to application of voltage and has improved driving characteristics, and a display device including the same.

Technical Solution

An optical path control member according to an embodiment includes: a lower substrate; a lower electrode disposed on an upper surface of the lower substrate; an upper substrate disposed on the lower substrate; an upper electrode disposed on a lower surface of the upper substrate; a light conversion unit disposed between the lower electrode and the upper electrode; and an adhesive layer between the light conversion unit and the upper electrode, wherein the light conversion unit includes a partition wall part and an accommodation part alternately disposed, the accommodation part changes light transmittance according to application of voltage, when a ratio of a thickness and a dielectric constant (thickness/dielectric constant) of the accommodation part is defined as A, and a ratio of a thickness and a dielectric constant (thickness/dielectric constant) of the adhesive layer is defined as B, the value of A is greater than the value of B.

Advantageous Effects

An optical path control member according to an embodiment can include a light conversion unit in which light transmittance is changed according to application of voltage.

That is, when a voltage is not applied, the light conversion unit of the optical path control member according to the embodiment can be driven as a light blocking part, and when the voltage is applied, the light conversion unit can be driven as a light transmitting part.

Accordingly, the optical path control member according to the embodiment can be applied in various ways according to a user's usage environment. That is, the optical path control member according to the embodiment may be driven as a switchable light blocking film.

In addition, an accommodation part of the light conversion unit of the optical path control member according to the embodiment extends from a light incident part toward a light emitting part and a width of the accommodation part can be widened. Further, when the voltage is applied, since light absorbing particles are moved in a direction in which the width is narrowed, the light absorbing particles can be easily moved, thereby improving efficiency of the optical path control member.

Further, the accommodation part of the light conversion unit can be disposed to be spaced apart from an electrode in a direction of a visual field surface or an electrode in a direction opposite to the direction of the visual field surface to reduce a decrease in light transmission by the accommodation part and improve brightness. Accordingly, visibility of the optical path control member can be improved.

In addition, the optical path control member according to the embodiment can control characteristics of the adhesive layer between the accommodation part and an upper electrode.

In detail, when the adhesive layer has dielectric properties, it is possible to increase an electric capacity of the adhesive layer by increasing the dielectric constant and decreasing the thickness of the adhesive layer. Accordingly, the voltage transmitted from the upper electrode can be applied to the accommodation part more, and the voltage of the accommodation part can be increased, thereby reducing the response speed of the optical path control member. Accordingly, it is possible to improve the driving characteristics of the optical path control member by reducing the response speed of the optical path control member.

In addition, when the adhesive layer has the resistor characteristic, the voltage transfer from the upper electrode to the accommodation part is increased by controlling the volume resistance of the adhesive layer to a specific range, thereby reducing the response speed of the optical path control member. Accordingly, it is possible to improve the driving characteristics of the optical path control member by reducing the response speed of the optical path control member.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switching optical path control member that drives in various modes according to application of voltage. The optical path control member according to the embodiment may be used as a light blocking film. The optical path control member according to the embodiment may be used as a privacy film.

Figure 1:
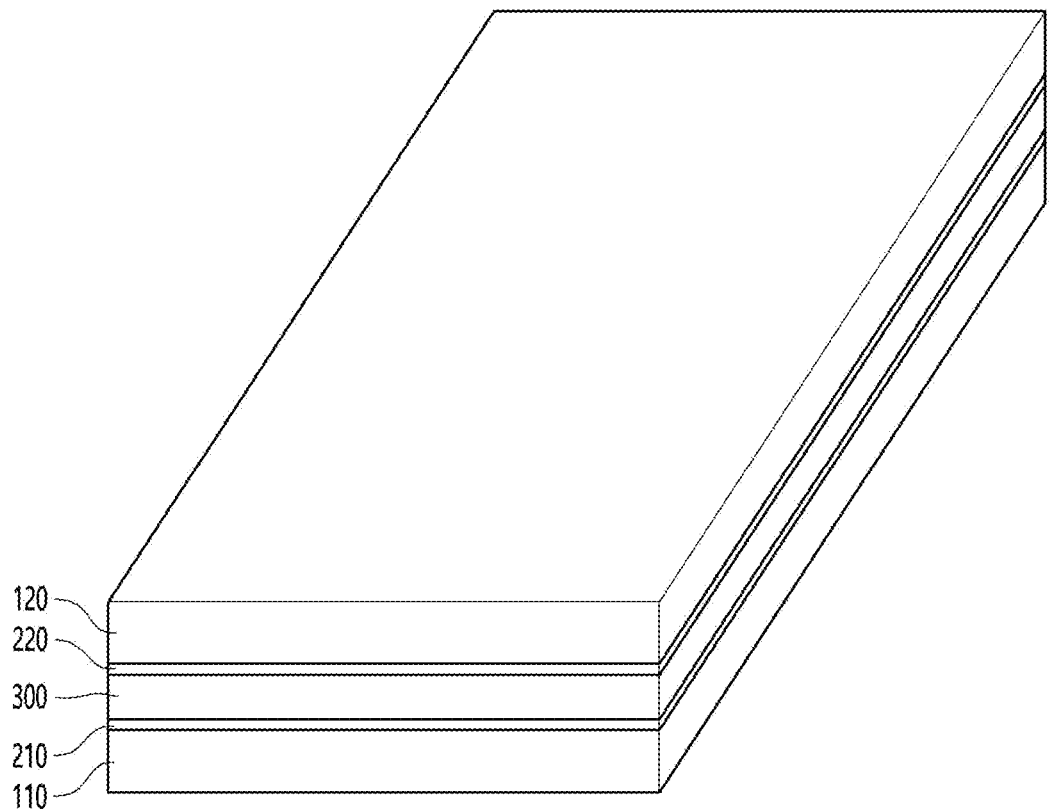
FIG. 1 is a view showing a perspective view of an optical path control member according to an embodiment.
Figure 2:
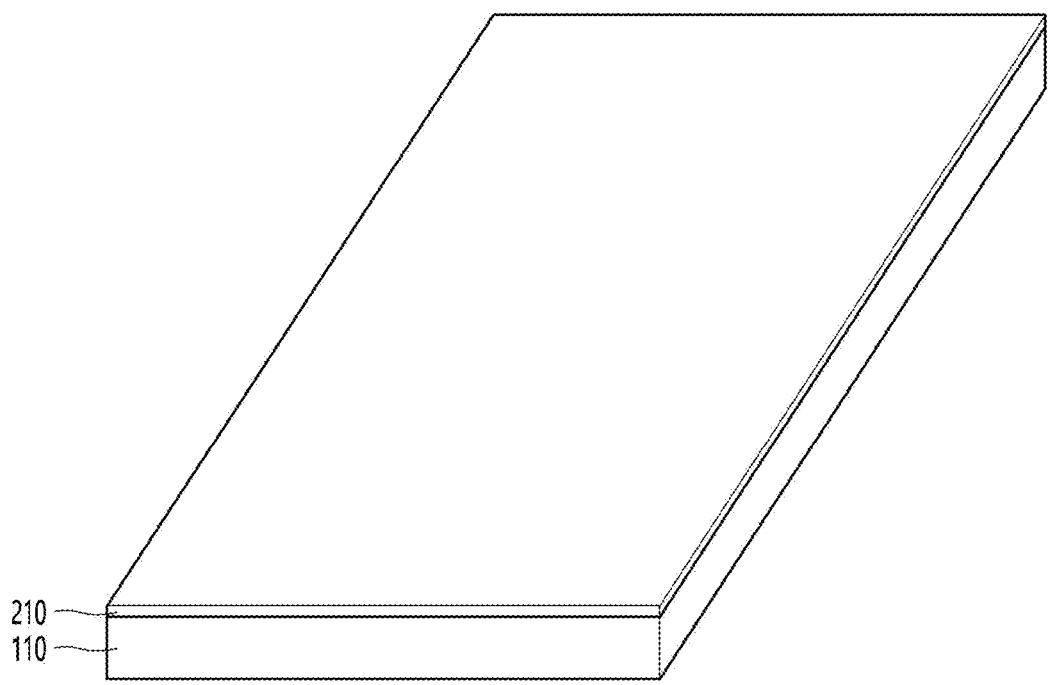
FIGS. 2 and 3 are views showing a perspective view of a lower substrate and a lower electrode, and an upper substrate and an upper electrode of the optical path control member according to the embodiment, respectively.
Figure 3:
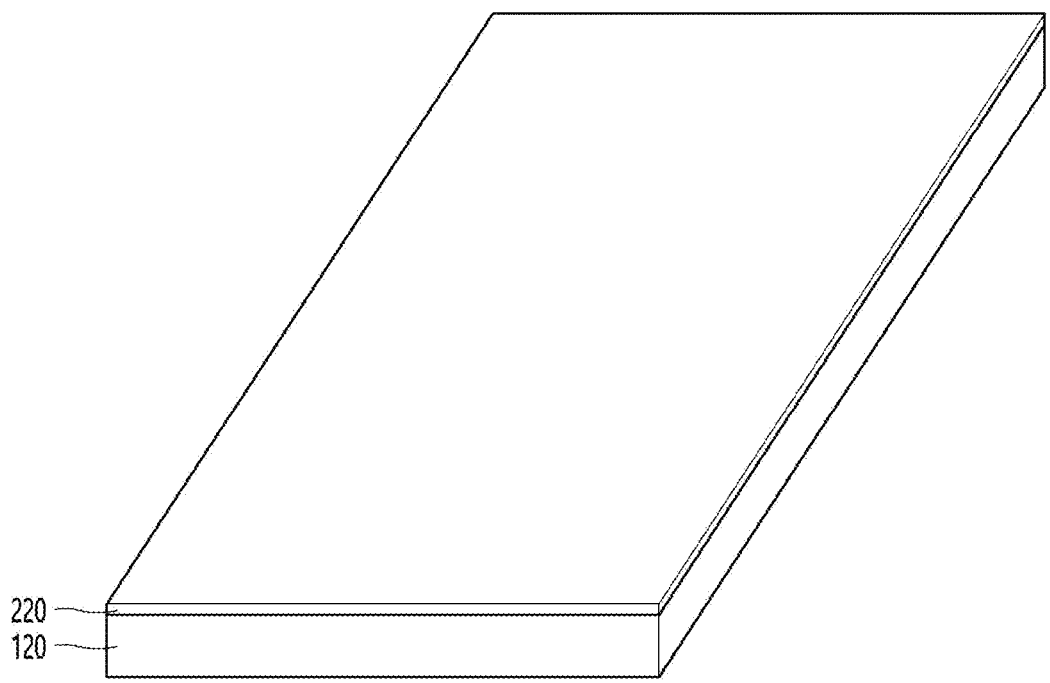

Referring to FIGS. 1 to 3, an optical path control member according to an embodiment may include a lower substrate 110, an upper substrate 120, a lower electrode 210, an upper electrode 220, and a light conversion unit 300.

The lower substrate 110 may support the lower electrode 210. The lower substrate 110 may be rigid or flexible.

In addition, the lower substrate 110 may be transparent. For example, the lower substrate 110 may include a transparent substrate capable of transmitting light.

The lower substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the lower substrate 110 may be a flexible substrate having flexible characteristics.

Further, the lower substrate 110 may be a curved or bended substrate. That is, the optical path control member including the lower substrate 110 may also be formed to have flexible, curved, or bent characteristics. Accordingly, the optical path control member according to the embodiment may be changed to various designs.

The lower substrate 110 may have a thickness of about 1 mm or less.

The lower electrode 210 may be disposed on one surface of the lower substrate 110. In detail, the lower electrode 210 may be disposed on an upper surface of the lower substrate 110. That is, the lower electrode 210 may be disposed between the lower substrate 110 and the upper substrate 120.

The lower electrode 210 may contain a transparent conductive material. For example, the lower electrode 210 may contain a metal oxide such as indium tin oxide, indium zinc oxide, copper oxide, tin oxide, zinc oxide, titanium oxide, etc.

The lower electrode 210 may be disposed on the lower substrate 110 in a film shape. In addition, light transmittance of the lower electrode 210 may be about 80% or more.

The lower electrode 210 may have a thickness of about 10 nm to about 50 nm.

Alternatively, the lower electrode 210 may contain various metals to realize low resistance. For example, the lower electrode 210 may contain at least one metal of chromium (Cr), nickel (Ni), copper (Cu), aluminum (Al), silver (Ag), molybdenum (Mo). gold (Au), titanium (Ti), and alloys thereof.

Alternatively, the lower electrode 210 may include a plurality of conductive patterns. For example, the lower electrode 210 may include a plurality of mesh lines intersecting each other and a plurality of mesh openings formed by the mesh lines.

Accordingly, even though the lower electrode 210 contains a metal, visibility may be improved because the lower electrode 210 is not visible from the outside. In addition, the light transmittance is increased by the openings, so that the brightness of the optical path control member according to the embodiment may be improved.

The upper substrate 120 may be disposed on the lower substrate 110. In detail, the upper substrate 120 may be disposed on the lower electrode 210 on the lower substrate 110.

The upper substrate 120 may contain a material capable of transmitting light. The upper substrate 120 may contain a transparent material. The upper substrate 120 may contain the same material as or similar to the lower substrate 110 described above.

For example, the upper substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the upper substrate 120 may be a flexible substrate having flexible characteristics.

Further, the upper substrate 120 may be a curved or bended substrate. That is, the optical path control member including the upper substrate 120 may also be formed to have flexible, curved, or bent characteristics. Accordingly, the optical path control member according to the embodiment may be changed to various designs.

The upper substrate 120 may have a thickness of about 1 mm or less.

The upper electrode 220 may be disposed on one surface of the upper substrate 120. In detail, the upper electrode 220 may be disposed on a lower surface of the upper substrate 120. That is, the upper electrode 220 may be disposed on a surface on which the upper substrate 120 faces the lower substrate 110. That is, the upper electrode 220 may be disposed facing the lower electrode 210 on the lower substrate 110. That is, the upper electrode 220 may be disposed between the lower electrode 210 and the upper substrate 120.

The upper electrode 220 may contain a transparent conductive material. For example, the upper electrode 220 may contain a metal oxide such as indium tin oxide, indium zinc oxide, copper oxide, tin oxide, zinc oxide, titanium oxide, etc.

The upper electrode 220 may be disposed on the lower substrate 110 in a film shape. In addition, the light transmittance of the upper electrode 220 may be about 80% or more.

The upper electrode 220 may have a thickness of about 10 nm to about 50 nm.

Alternatively, the upper electrode 220 may contain various metals to realize low resistance. For example, the upper electrode 120 may contain at least one metal of chromium (Cr), nickel (Ni), copper (Cu), aluminum (Al), silver (Ag), molybdenum (Mo). gold (Au), titanium (Ti), and alloys thereof.

Alternatively, the upper electrode 220 may include a plurality of conductive patterns. For example, the upper electrode 220 may include a plurality of mesh lines intersecting each other and a plurality of mesh openings formed by the mesh lines.

Accordingly, even though the upper electrode 220 contains a metal, visibility may be improved because the upper electrode 220 is not visible from the outside. In addition, the light transmittance is increased by the openings, so that the brightness of the optical path control member according to the embodiment may be improved.

The light conversion unit 300 may be disposed between the lower substrate 110 and the upper substrate 120. In detail, the light conversion unit 300 may be disposed between the lower electrode 210 and the upper electrode 220.

Referring to FIGS. 4 to 7, the light conversion unit 300 may include a partition wall part 310, and an accommodation part 320.

The partition wall part 310 may be defined as a partition wall region for partitioning a region of the light conversion unit, and the accommodation part 320 may be defined as a variable region that is variable to a light blocking unit and a light transmitting unit according to application of voltage.

The partition wall part 310 and the accommodation part 320 may be alternately disposed. The partition wall part 310 and the accommodation part 320 may be disposed in different widths. For example, the width of the accommodation part 320 may be greater than the width of the accommodation part 320.

The partition wall part 310 and the accommodation part 320 may be disposed in contact with at least one of the lower electrode 210 and the upper electrode 220.

For example, the partition wall part 310 and the accommodation part 320 may be disposed in direct contact with the lower electrode 210 and may be disposed in indirect contact with the upper electrode 220. That is, an adhesive layer 400 for adhering the lower substrate 110 and the upper substrate 120 may be disposed on the light conversion unit 300, and the partition wall part 310 and the accommodation part 320 may be disposed in indirect contact with the upper electrode 220.

That is, the adhesive layer 400 may be disposed between the light conversion unit 300 and the upper electrode 220. The adhesive layer 400 may have dielectric properties or resistor properties. In detail, the adhesive layer 400 may have the dielectric or resistor properties so that a voltage at the upper electrode 220 on the adhesive layer may be easily transferred to the accommodation part 320 of the light conversion unit 300.

The adhesive layer 400 will be described in detail below.

However, the embodiment is not limited thereto, and the partition wall part 310 and the accommodation part 320 may be disposed to be spaced apart from the lower electrode 210 and the upper electrode 220.

In detail, a buffer layer for improving adhesion between the lower electrode 210 and the light conversion unit 300 may be disposed between the lower electrode 210 and the light conversion unit 300. Accordingly, the partition wall part 310 and the accommodation part 320 may be disposed to be spaced apart from both the lower electrode 210 and the upper electrode 220.

The partition wall part 310 and the accommodation part 320 may be alternately disposed. In detail, the partition wall part 310 and the accommodation part 320 may be alternately disposed. That is, each of the partition wall parts 310 may be disposed between the accommodation parts 320 adjacent to each other, and each of the accommodation parts 320 may be disposed between the partition wall parts 310 adjacent to each other.

The partition wall part 310 may contain a transparent material. The partition wall part 310 may contain a material that may transmit light.

The partition wall part 310 may contain a resin material. For example, the partition wall part 310 may contain a photo-curable resin material. As an example, the partition wall part 310 may contain a UV resin or a transparent photoresist resin. Alternatively, the partition wall part 310 may contain urethane resin or acrylic resin.

The partition wall part 310 may transmit light incident on any one of the lower substrate 110 and the upper substrate 120 toward another substrate.

For example, in FIGS. 4 to 7, light may be incident in a direction of the lower substrate 110 and the light may be emitted to the lower substrate 110. The partition wall part 310 may transmit the light, and the transmitted light may be moved in a direction of the upper substrate 120.

The accommodation part 320 may include an electrolyte 320a and light absorbing particles 320b. In detail, the accommodation part 320 is filled with the electrolyte 320a, and a plurality of the light absorbing particles 320b may be dispersed in the electrolyte 320a. That is, a light conversion material containing the electrolyte 320a and the light absorbing particles 320b may be accommodated in the accommodation part 320.

The electrolyte 320a may be a material for dispersing the light absorbing particles 320b. The electrolyte 320a may contain a transparent material. The electrolyte 320a may contain a paraffinic solvent. In addition, the electrolyte 320a may contain a material capable of transmitting light.

The light absorbing particles 320b may be disposed to be dispersed in the electrolyte 320a. In detail, the plurality of light absorbing particles 320b may be disposed to be spaced apart from each other in the electrolyte 320a.

The light absorbing particles 320b may include a color. For example, the light absorbing particles 320b may include black light absorbing particles. As an example, the light absorbing particles 320b may include carbon black.

The light absorbing particles 320b may be formed in a spherical shape. The light absorbing particles 320b may have a diameter of several nanometers.

The accommodation part 320 may be changed in the light transmittance by the light absorbing particles 320b. In detail, the light transmittance of the accommodation part 320 may be changed to a light blocking part and a light transmitting part by the light absorbing particles 320b.

For example, the optical path control member according to the embodiment may be changed from a first mode to a second mode or from the second mode to the first mode by a voltage applied to the first electrode 210 and the second electrode 220.

That is, the optical path control member may be driven while changing from the initial mode to the first mode and the second mode according to application of voltage.

In detail, in the optical path control member according to the embodiment, the accommodation part 320 becomes the light blocking part in the first mode, and light of a specific angle may be blocked by the accommodation part 320. That is, a viewing angle of a user viewing from the outside may be narrowed.

In detail, in the first mode in which no voltage is applied to a pattern part, the light absorbing particles 320b are uniformly dispersed in the electrolyte 320a so that the accommodation part 320 may block the light by the light absorbing particles.

In addition, in the optical path control member according to the embodiment, the accommodation part 320 becomes the light transmitting part in the second mode, and in the optical path control member according to the embodiment, light may be transmitted through both the partition wall part 310 and the accommodation part 320. That is, the viewing angle of the user viewing from the outside may be widened.

In detail, in the second mode in which a voltage is applied to the pattern part, the light absorbing particles 320b are agglomerated into one region of the electrolyte 320a so that the accommodation part 320 may transmit light by the electrolyte.

Switching from the first mode to the second mode, that is, the conversion of the accommodation part 320 from the light blocking part to the light transmitting part may be realized by movement of the light absorbing particles 320b of the accommodation part 320.

In detail, the accommodation part 320 may be electrically connected to the lower electrode 210 and the upper electrode 220.

At this time, when a voltage is not applied to the optical path control member from the outside, the light absorbing particles 320b of the accommodation part 320 are uniformly dispersed in the electrolyte 320a, and the accommodation part 320 may block light by the light absorbing particles. Accordingly, in the first mode, the accommodation part 320 may be driven as the light blocking part.

Alternatively, when a voltage is applied to the optical path control member from the outside, the light absorbing particles 320b may move. For example, the light absorbing particles 320b may move toward one end or the other end of the accommodation part 320 by a voltage transmitted through the lower electrode 210 and the upper electrode 220 to be agglomerated. That is, the light absorbing particles 320b may move from the accommodation part 320 toward the lower electrode or the upper electrode to be agglomerated.

As a method of moving the light absorbing particles, first, the light absorbing particles including the carbon black may be charged. For example, micelles may be formed and a charging effect may be created by charging the carbon black light absorbing particles themselves with a negative charge or chemically introducing a functional group similar to a surfactant to a surface of the carbon black light absorbing particles to charge the light absorbing particles.

Subsequently, when a voltage is applied to the lower electrode 210 and/or the upper electrode 220, an electric field is formed between the lower electrode 210 and the upper electrode 220, and the charged carbon black light absorbing particles may be moved toward a positive electrode of the lower electrode 210 and the upper electrode 220 using the electrolyte 320a as a medium.

Figure 5:
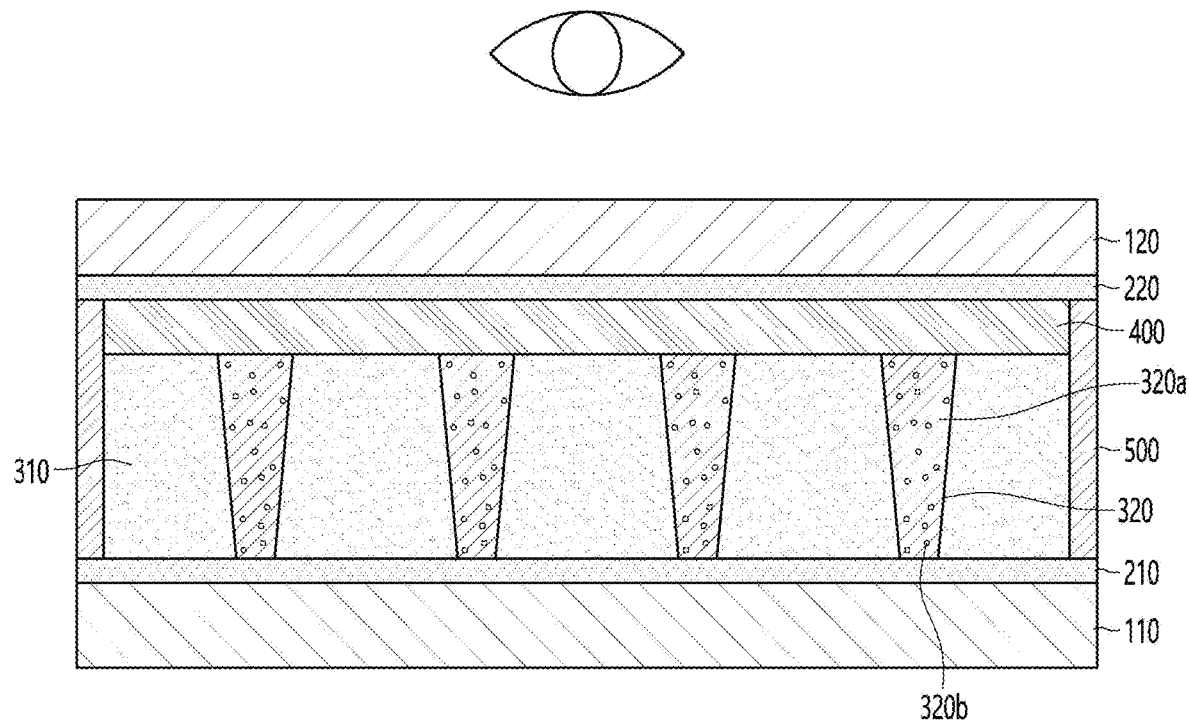
Figure 7:
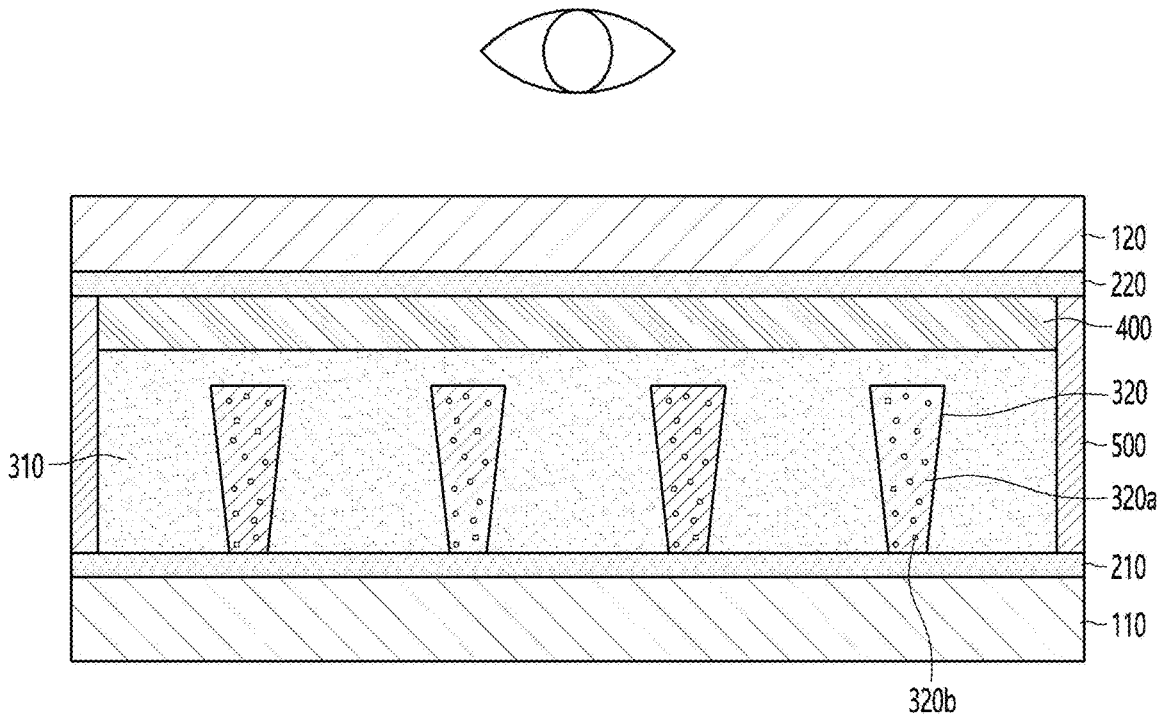
Figure 8:
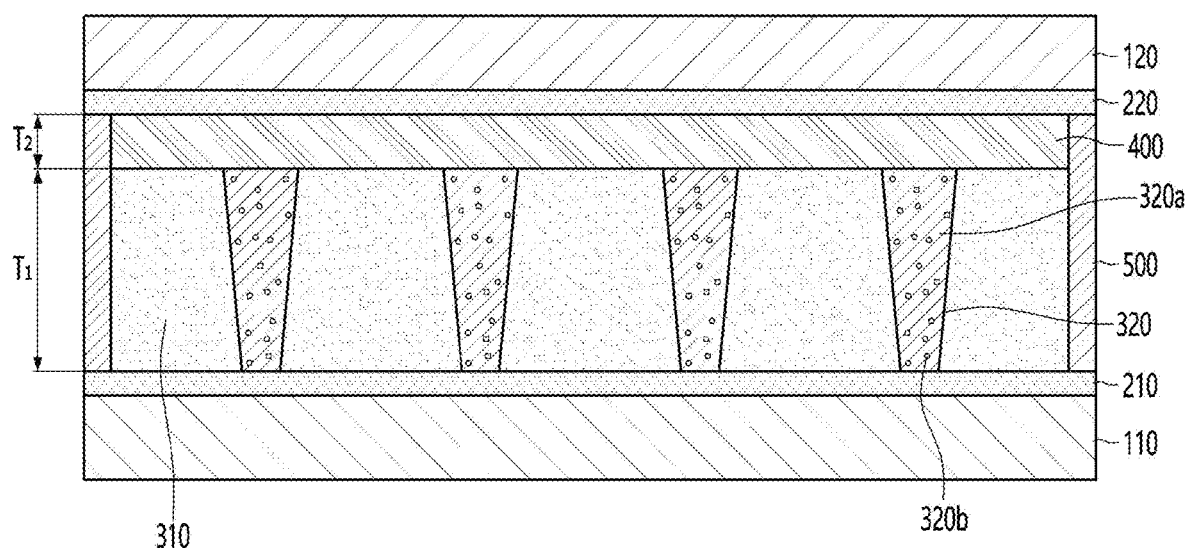
FIG. 8 is a view for describing driving characteristics according to a thickness of an adhesive layer of the optical path control member according to the embodiment.

That is, when the voltage is not applied to the lower electrode 210 and/or the upper electrode 220, as shown in FIGS. 5 and 7, the light absorbing particles 320b may be uniformly dispersed in the electrolyte 320a to drive the accommodation part 320 as the light blocking part.

Figure 4:
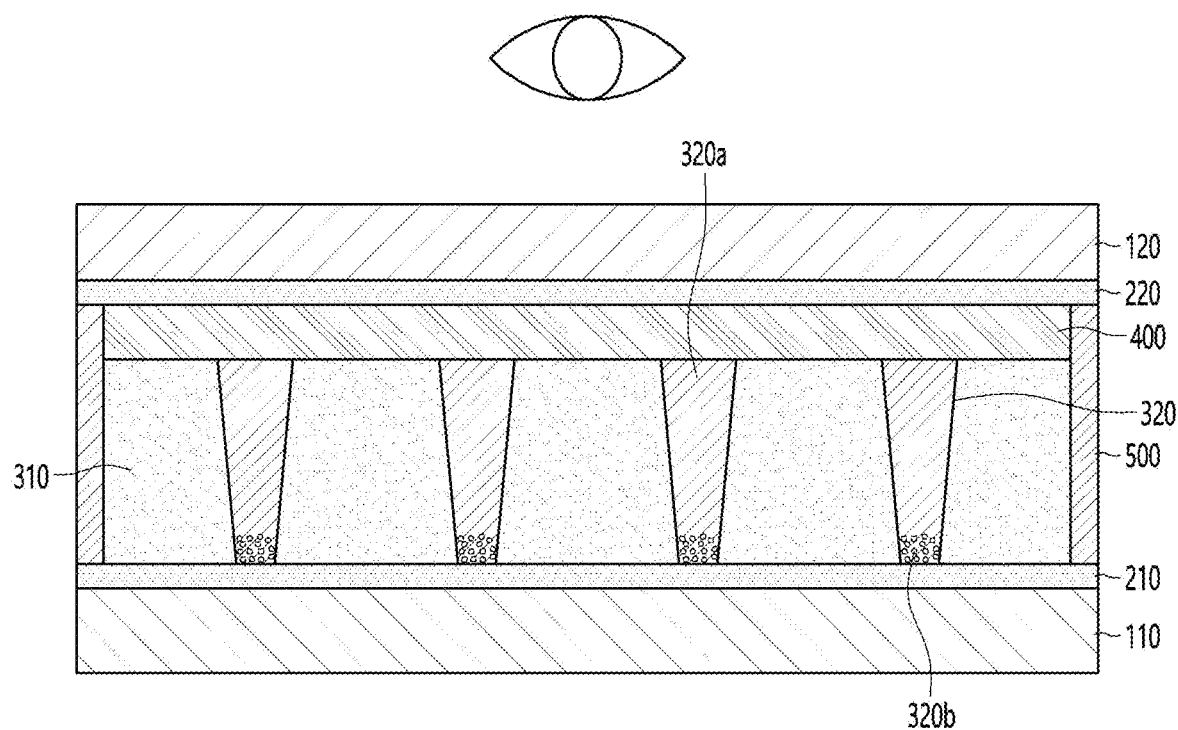
FIGS. 4 to 7 are views showing a cross-sectional view of an optical path control member according to an embodiment.
Figure 6:
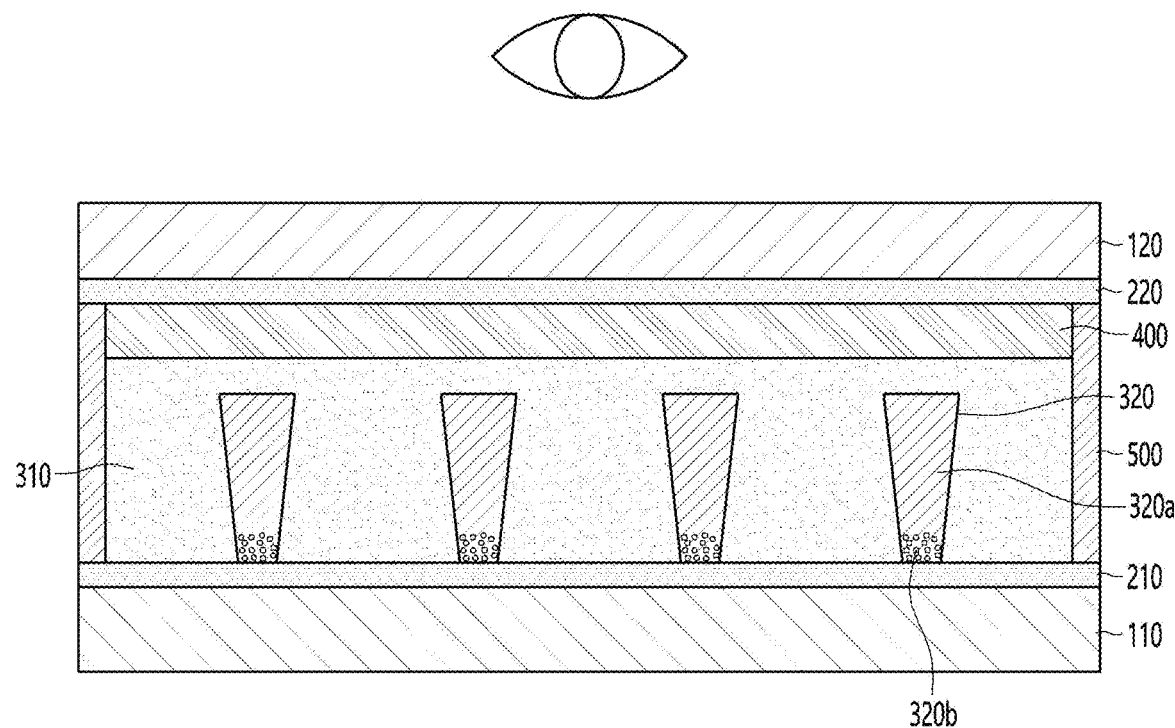

In addition, when the voltage is applied to the lower electrode 210 and/or the upper electrode 220, as shown in FIGS. 4 and 6, the light absorbing particles 320*b* may be moved toward the upper electrode 220 in the electrolyte 320*a*. That is, the light absorbing particles 320*b* are moved in one direction, and the accommodation part 320 may be driven as the light transmitting part.

Accordingly, the optical path control member according to the embodiment may be driven in two modes according to a user's surrounding environment. That is, when the user requires light transmission only at a specific viewing angle, the accommodation part is driven as the light blocking part, or in an environment in which the user requires high brightness, a voltage may be applied to drive the accommodation part as the light transmitting part.

Therefore, since the optical path control member according to the embodiment may be implemented in two modes according to the user's requirement, the optical path control member may be applied regardless of the user's environment.

Meanwhile, the accommodation part 320 may be formed in various shapes.

Referring to FIGS. 4 and 5, a width of the accommodation part 320 may be changed while the accommodation part 320 extends from one end of the accommodation part 320 to the other end thereof.

For example, referring to FIGS. 4 and 5, the accommodation part 320 may be formed in a trapezoidal shape. In detail, the accommodation part 320 may be formed so that the width of the accommodation part 320 is widened while extending from the lower electrode 210 toward the upper electrode 220.

That is, the width of the accommodation part 320 may be narrowed while extending from a visual field surface of the user toward an opposite surface thereof. In addition, when a voltage is applied to the light conversion unit, the light absorbing particles of the accommodation part 320 may be moved in a direction in which the width of the accommodation part is narrowed.

That is, the width of the of the accommodation part 320 may be widened while extending from a light incident part in which light is incident toward a light emitting part in which light is emitted.

That is, the light absorbing particles of the accommodation part 320 may be moved toward the lower electrode 210.

Accordingly, since the light absorbing particles are moved toward the opposite surface of the visual field surface instead of the visual field surface, it is possible to inhibit blocking of light emitted toward the visual field surface, thereby improving the brightness of the optical path control member.

In addition, since the light absorbing particles are moved from a wide region toward a narrow region, the light absorbing particles may be easily moved.

In addition, since the light absorbing particles move to the narrow region of the accommodation part, an amount of light transmitted toward the visual field surface of the user is increased, thereby improving front brightness.

Or, conversely, the accommodation part 320 may be formed so that the width of the accommodation part 320 is narrowed while extending from the lower electrode 210 toward the upper electrode 220.

That is, the width of the accommodation part 320 may be widened while extending from the visual field surface of the user toward the opposite surface thereof. In addition, when a voltage is applied to the light transmitting part, the light absorbing particles of the accommodation part 320 may be moved in a direction in which the width of the accommodation part is widened.

That is, the width of the of the accommodation part 320 may be narrowed while extending from the light incident part in which the light is incident toward the light emitting part in which the light is emitted.

That is, the light absorbing particles of the of the accommodation part 320 may be moved toward the lower electrode 210.

Accordingly, a contact region between the lower electrode and one surface of the accommodation part through which the light absorbing particles move is increased, so that a moving speed of the light absorbing particles, that is, a driving speed may be increased.

Meanwhile, the accommodation part 320 may be disposed to be spaced apart from the lower electrode 210 or the upper electrode 220.

For example, referring to FIGS. 6 and 7, the accommodation part 320 is formed to partially pass through the light conversion unit 300, and accordingly, a base part may be disposed between the accommodation part 320 and the first electrode 210. The base part may include the same material as the partition wall part 310 and may be integrally formed with the partition wall part 310.

In detail, the accommodation part 320 may be disposed to be spaced apart from the first electrode 210.

Accordingly, the brightness of the optical path control member may be improved by increasing transmittance of light emitted toward the visual field surface, thereby improving visibility thereof.

As described above, in the optical path control member, the adhesive layer 400 may be disposed between the light conversion unit 300 and the upper electrode 220 in order to adhere the light conversion unit 300 on the lower substrate 110 and the upper electrode 220 on the upper substrate 120 to each other.

The adhesive layer 400 may include a material capable of transmitting light so that light passing through the pattern part in the lower substrate 110 is emitted toward the upper substrate 120. In detail, the adhesive layer 400 may have light transmittance of about 85% or more, a haze of about 1.0 or less, and a chromaticity index (b*) of about 0.2 or less.

In addition, the adhesive layer 400 may be formed to have a thickness of about 5 μm to 100 μm. In detail, the adhesive layer 400 may be formed to have a thickness of about 5 μm to 30 μm.

When the thickness of the adhesive layer 400 is less than about 5 μm, an adhesive force between the light conversion unit 300 and the upper electrode 220 may be reduced, and thus the reliability of the optical path control member may be deteriorated. In addition, when the thickness of the adhesive layer 400 exceeds about 150 μm, a thickness of the optical path control member may increase, and as the number of paths in which a voltage is applied from the upper electrode 220 toward the light conversion unit 300 is increased, voltage loss may be increased.

Meanwhile, the voltage transmitted from the upper electrode 220 may be applied to the accommodation part 320 of the light conversion unit 300 to move the light absorbing particles 320*b* inside the accommodation part 320. At this time, as the voltage transmitted from the upper electrode 220 to the accommodation part 320 increases, the movement of the light absorbing particles in the accommodation part 320 may be smoothed, thereby improving driving characteristics of the optical path control member.

For example, the adhesive layer 400 may have the dielectric properties or resistor properties, whereby a voltage may be transferred from the upper electrode 220 to the accommodation part 320 via the adhesive layer 400.

In this case, a driving speed for the movement of the light absorbing particles in the accommodation part may be defined by the following equation.

$$t_{switching} = \frac{d}{\mu_E * E} = \frac{d^2}{\mu_E * V} \quad \text{[Equation 1]}$$

$$\text{Electrophoretic mobility } (\mu_E) = \frac{\text{terminal velocity}}{\text{applied electric field } (E)} \quad \text{[Equation 2]}$$

$$E = \frac{\text{Voltage } (V)}{\text{Electrode distance } (d)} \quad \text{[Equation 3]}$$

That is, it can be seen that a response time t related to the driving speed for the movement of the light absorbing particles in the accommodation part decreases as an electrophoretic mobility is large, a voltage is large, and a distance between electrodes is small. In conclusion, it can be seen that a voltage applied to the accommodation part should be increased in order to improve the driving characteristics of the optical path control member by making the response speed of the optical path control member small, that is, fast.

To this end, the adhesive layer 400 may have the dielectric properties or resistor properties.

For example, the adhesive layer 400 may have the dielectric properties.

Figure 9:
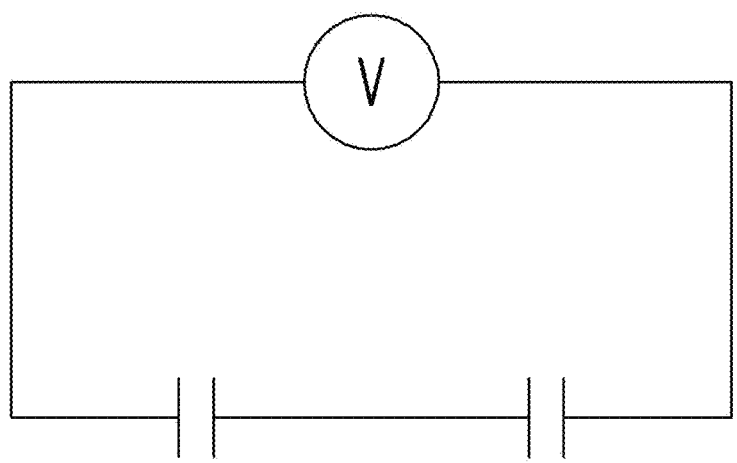
FIGS. 9 and 10 are views for describing voltage transmission of the optical path control member according to the embodiment.
Figure 10:
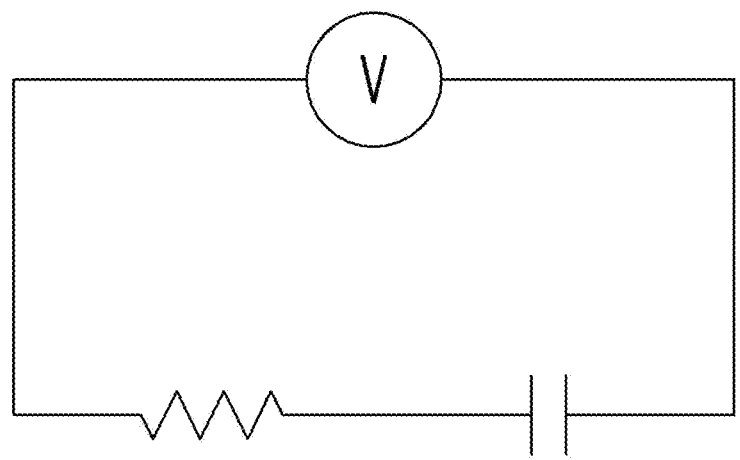

Referring to FIGS. 9 and 10, when the adhesive layer 400 acts as a dielectric, the optical path control member becomes a capacitor in which the adhesive layer 400 and the accommodation part 320 are connected in series, and it can be seen that the voltage of the adhesive layer 400 needs to be high in order to apply more voltage to the accommodation part 320.

To this end, the adhesive layer 400 may have the dielectric properties, and a dielectric constant and a thickness T2 of the adhesive layer 400 and a dielectric constant and a thickness T1 of the accommodation part 320 may be controlled.

Referring to FIG. 9, an electric capacity of the adhesive layer and the accommodation part is proportional to the dielectric constant and inversely proportional to the thickness, and the voltage of the adhesive layer and the accommodation part may be inversely proportional to the dielectric constant and may be proportional to the thickness.

In this case, in order to increase the voltage applied to the accommodation part, the dielectric constant of the accommodation part should be small and the thickness should be large, and in order to increase the voltage applied to the accommodation part, the electric capacity of the adhesive layer 400 should be increased. That is, in case of the adhesive layer, the electric capacity of the adhesive layer may be increased when the dielectric constant is large and the thickness is small.

In detail, when a ratio (thickness/dielectric constant) of the thickness and the dielectric constant of the accommodation part 320 is defined as A and a ratio of the thickness and the dielectric constant (thickness/dielectric constant) of the adhesive layer 400 is defined as B, a value of A may be greater than a value of B. In detail, the ratio A of the thickness and the dielectric constant of the accommodation part 320 may be as large as 5 times or more with respect to the ratio B of the thickness and the dielectric constant of the adhesive layer 400. In more detail, the ratio A of the thickness and the dielectric constant of the accommodation part 320 may be as large as 10 times or more with respect to the ratio B of the thickness and the dielectric constant of the adhesive layer 400.

In detail, the accommodation part 320 may have a dielectric constant (F/m) of 2 to 4, may have a thickness of about 40 μm to 150 μm, and the ratio A of the thickness and the dielectric constant of the accommodation part 320 may be about 20 to 40.

The adhesive layer 400 may have a dielectric constant (F/m) of 2 to 9, may have a thickness of about 5 μm to 100 μm, and the ratio B of the thickness and the dielectric constant of the adhesive layer 400 may be 1 to 50.

By controlling a range value of the thickness and the dielectric constant of each component of the accommodation part 320 and the adhesive layer 400, the optical path control member may set so that the ratio A of the thickness and the dielectric constant of the accommodation part 320 becomes 5 times or more and preferably 10 times or more with respect to the ratio B of the thickness and the dielectric constant of the adhesive layer 400.

Accordingly, since the adhesive layer 400 has a small thickness and a large dielectric constant, the electric capacity of the adhesive layer 400 may be increased so that a larger voltage is applied to the accommodation part 320. In addition, since the accommodation part 320 has a large thickness and a small dielectric constant, the response speed of the optical path control member may be increased by increasing the voltage applied to the accommodation part 320, thereby improving the driving characteristics of the optical path control member.

Alternatively, referring to FIG. 10, the adhesive layer 400 may have the resistor properties.

In detail, referring to FIG. 10, the optical path control member becomes an RC circuit in which the adhesive layer 400 and the accommodation part 320 are connected in series, and in the RC circuit, when a predetermined time has elapsed, all electromotive force may be applied to the capacitor.

The adhesive layer 400 may have a volume resistance of about $10^7$ Ωcm or more. In detail, the adhesive layer 400 may have a volume resistance of about $10^7$ Ωcm to $10^{12}$ Ωcm.

When the volume resistance of the adhesive layer 400 is less than $10^7$ Ωcm, the conductivity of the adhesive layer 400 is too increased, so that the upper electrode 220 and the adhesive layer 400 are energized, and when the volume resistance of the adhesive layer 400 exceeds $10^{12}$ Ωcm, the conductivity of the adhesive layer 400 is too decreased, so that voltage transfer efficiency from the upper electrode 220 to the accommodation part 320 may be reduced.

The optical path control member according to the embodiment may include the pattern part in which the light transmittance is changed according to application of voltage.

That is, when a voltage is not applied, the pattern part of the optical path control member according to the embodiment may be driven as the light blocking part, and when the voltage is applied, the pattern part may be driven as the light transmitting part.

Accordingly, the optical path control member according to the embodiment may be applied in various ways according to a user's usage environment.

In addition, the width of the pattern part may be widened while the pattern part of the optical path control member according to the embodiment extends from the light incident part toward the light emitting part. Further, when the voltage is applied, since beads are moved in the direction in which the width is narrowed, the beads may be easily moved, thereby improving efficiency of the optical path control member.

Further, the pattern part may be disposed to be spaced apart from the electrode in the direction of the visual field surface or the electrode in the direction opposite to the direction of the visual field surface to reduce a decrease in light transmission by the pattern part and improve brightness. Accordingly, visibility of the optical path control member may be improved.

In addition, the optical path control member according to the embodiment may control characteristics of the adhesive layer between the accommodation part and the upper electrode serving as a variable pattern part.

In detail, when the adhesive layer has the dielectric properties, it is possible to increase the electric capacity of the adhesive layer by increasing the dielectric constant and decreasing the thickness of the adhesive layer. Accordingly, the voltage transmitted from the upper electrode may be applied to the accommodation part more, and the voltage of the accommodation part may be increased, thereby reducing the response speed of the optical path control member. Accordingly, it is possible to improve the driving characteristics of the optical path control member by reducing the response speed of the optical path control member.

In addition, when the adhesive layer has the resistor characteristic, the voltage transfer from the upper electrode to the accommodation part is increased by controlling the volume resistance of the adhesive layer to a specific range, thereby reducing the response speed of the optical path control member. Accordingly, it is possible to improve the driving characteristics of the optical path control member by reducing the response speed of the optical path control member.

Hereinafter, a method of manufacturing an optical path control member according to an embodiment will be described with reference to FIGS. 11 to 18.

Figure 11:
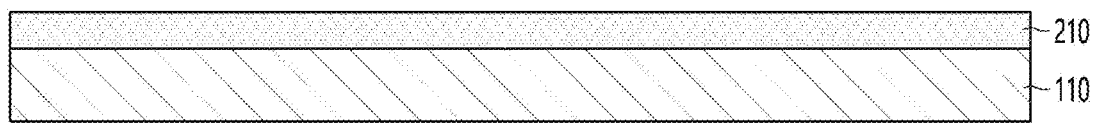
FIGS. 11 to 18 are views for describing a method of manufacturing an optical path control member according to an embodiment.

First, referring to FIG. 11, an electrode material forming a lower substrate 110 and a lower electrode is prepared. Subsequently, the electrode material may be formed on one surface of the lower substrate 110 by a coating or deposition process. In detail, the electrode material may be formed on the entire surface of the lower substrate 110. Accordingly, a lower electrode 210 formed as a surface electrode may be formed on the lower substrate 110.

Figure 12:
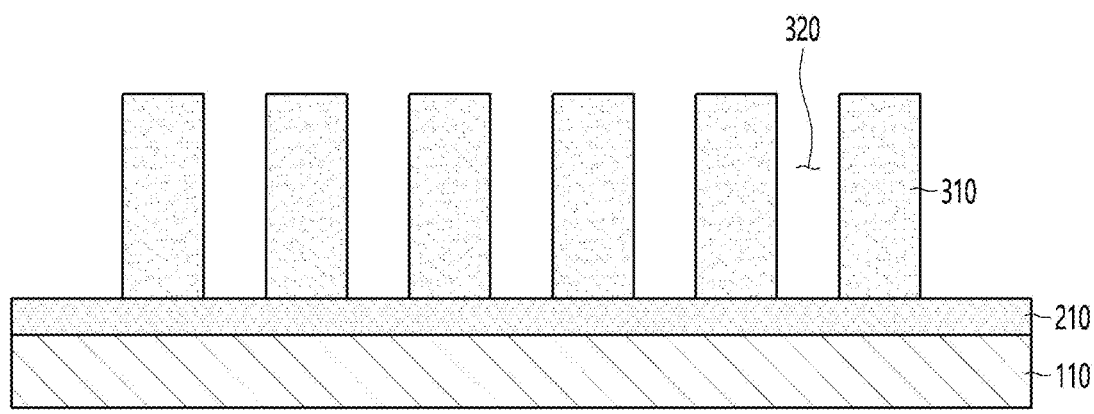

Subsequently, referring to FIG. 12, a resin layer may be formed by applying a resin material on the lower electrode 210. In detail, the resin layer may be formed by applying a urethane resin or an acrylic resin on the lower electrode 210.

Subsequently, a pattern part may be formed on the resin layer using a mold. In detail, holes or grooves are formed in the resin layer by imprinting the mold, and accordingly, a partition wall part may be formed by the remaining resin layer. That is, the partition wall part 310 and the accommodation part 320 described above may be formed on the resin layer.

Figure 13:

Subsequently, referring to FIG. 13, an electrode material forming an upper substrate 120 and an upper electrode is prepared. Subsequently, the electrode material may be formed on one surface of the upper substrate 120 by a coating or deposition process. In detail, the electrode material may be formed on the entire surface of the upper substrate 120. Accordingly, an upper electrode 220 formed as a surface electrode may be formed on the upper substrate 120.

Figure 14:
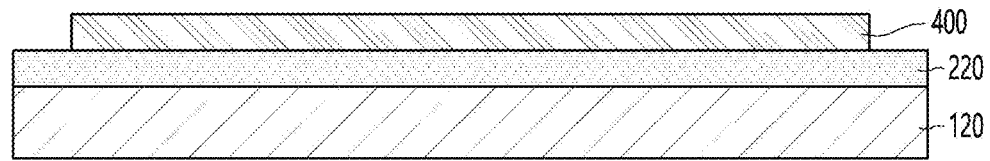

Subsequently, referring to FIG. 14, an adhesive layer 400 may be formed by applying an adhesive material on the upper electrode 220. The adhesive layer 400 may be formed on a partial region of the upper electrode 220.

Figure 15:
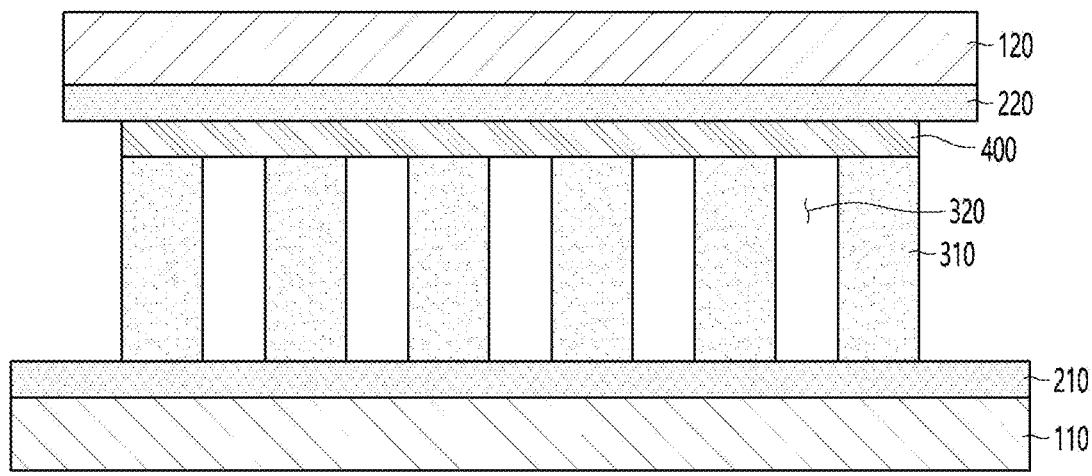
Figure 15:
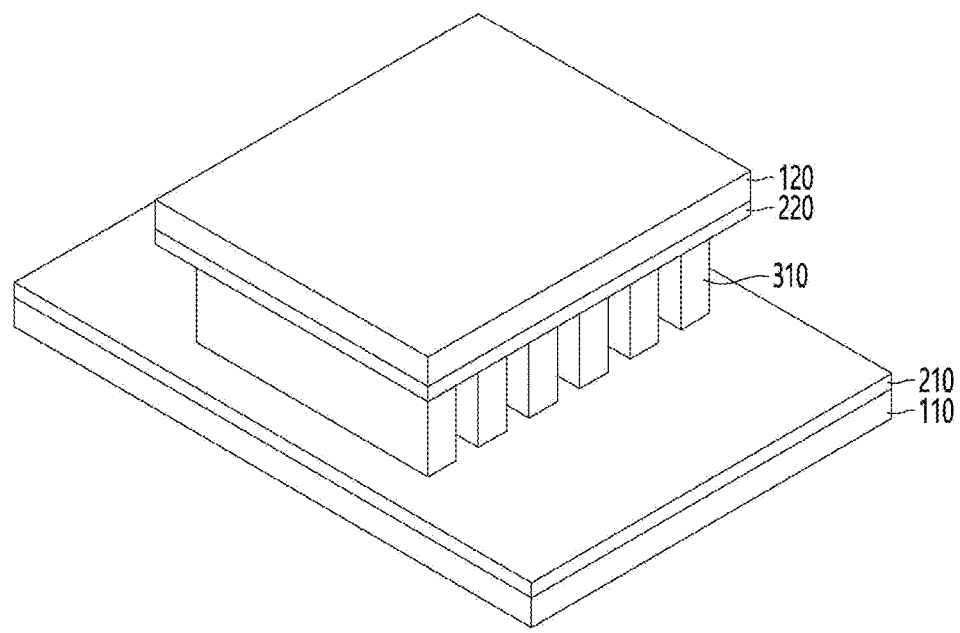

Subsequently, referring to FIG. 15, the lower substrate 110 and the upper substrate 120 manufactured in advance may be adhered. In detail, the lower substrate 110 and the upper substrate 120 may be adhered to each other through the adhesive layer 400 on the upper substrate 120.

In this case, the lower substrate 110 and the upper substrate 120 may be adhered in different directions. In detail, the lower substrate 110 and the upper substrate 120 may be adhered to each other so that a long side direction of the lower substrate 110 and a short side direction of the upper substrate 120 overlap each other.

Figure 16:
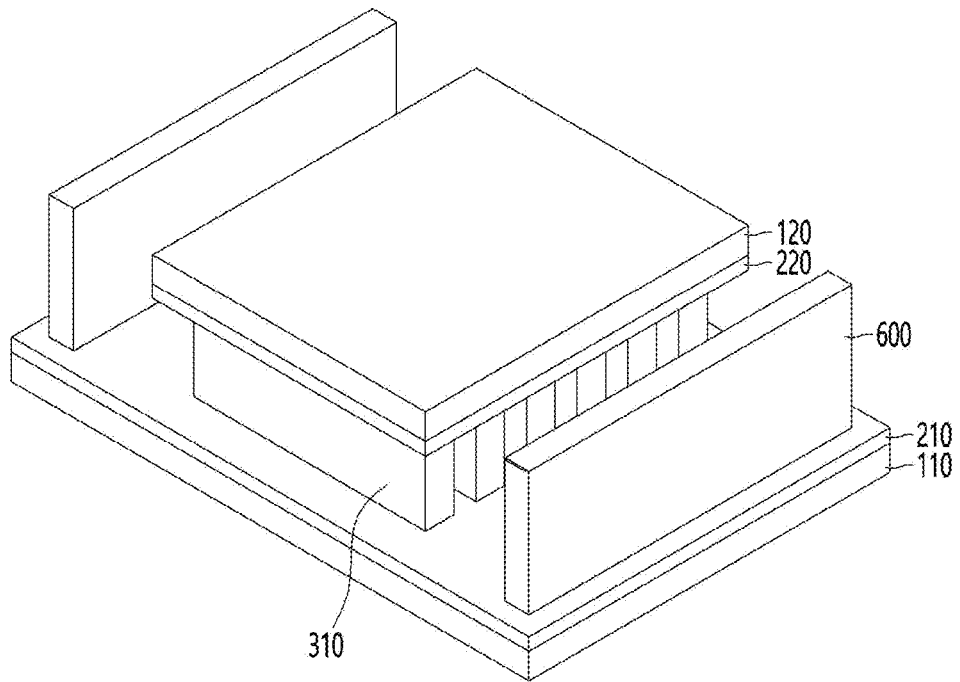

Subsequently, referring to FIG. 16, a dam part 600 may be formed on the lower substrate 110. In detail, the dam part 600 may be disposed above and below the accommodation part 320 disposed on the lower substrate 110. That is, the dam part 600 may be disposed so that the accommodation part 320 is disposed between the dam parts 600.

Figure 17:
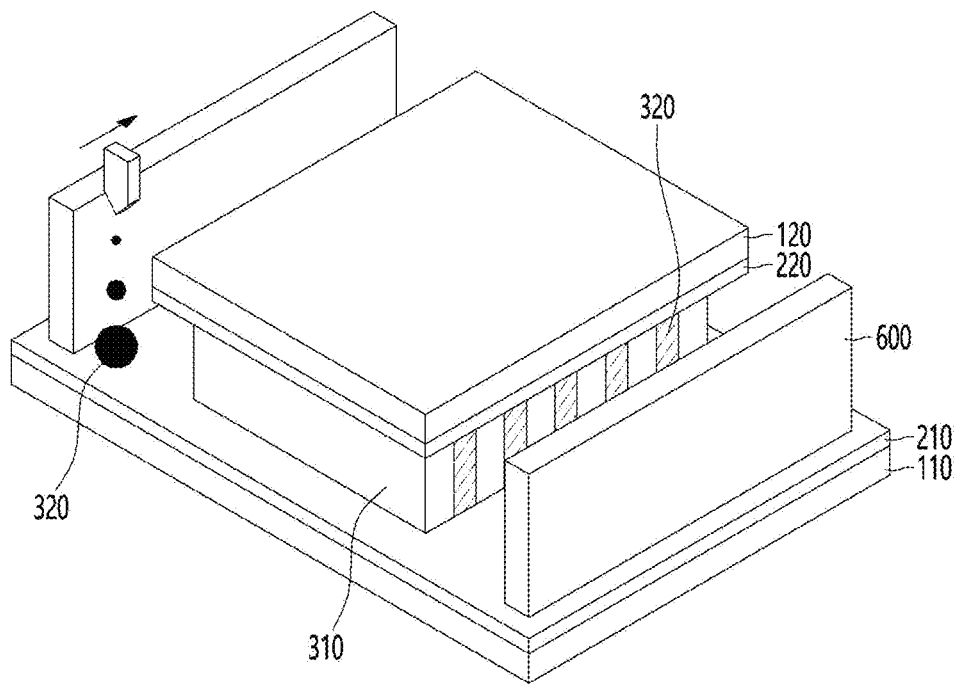

Subsequently, referring to FIG. 17, a light conversion material may be injected between the accommodation part 320, that is, the partition wall parts 310. In detail, a light conversion material in which light absorbing particles such as carbon black or the like are dispersed in an electrolyte solvent containing a paraffinic solvent may be injected between the accommodation part 320, that is, between the partition wall parts. Accordingly, the accommodation part 310 described above may be formed between the partition wall parts 310.

Figure 18:
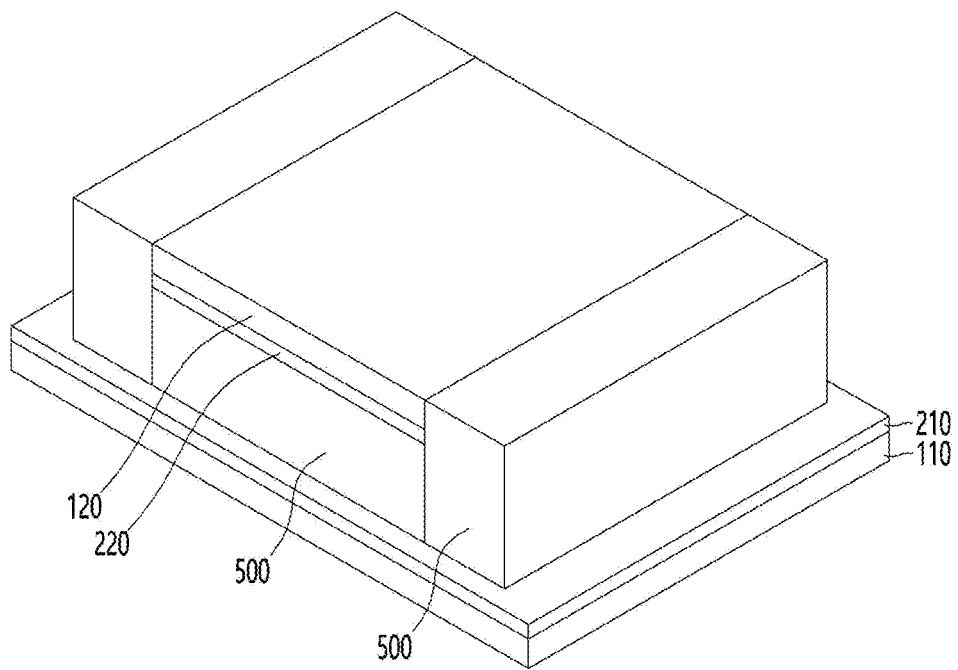

Subsequently, referring to FIG. 18, the light conversion material inside the accommodation part may be sealed from the outside by forming a sealing part 500 in the lateral direction of the accommodation part 320. Subsequently, a final optical path control member may be formed by cutting the lower substrate 110.

Hereinafter, referring to FIGS. 19 to 21, a display device and a display apparatus to which an optical path control member according to an embodiment is applied will be described.

Figure 19:
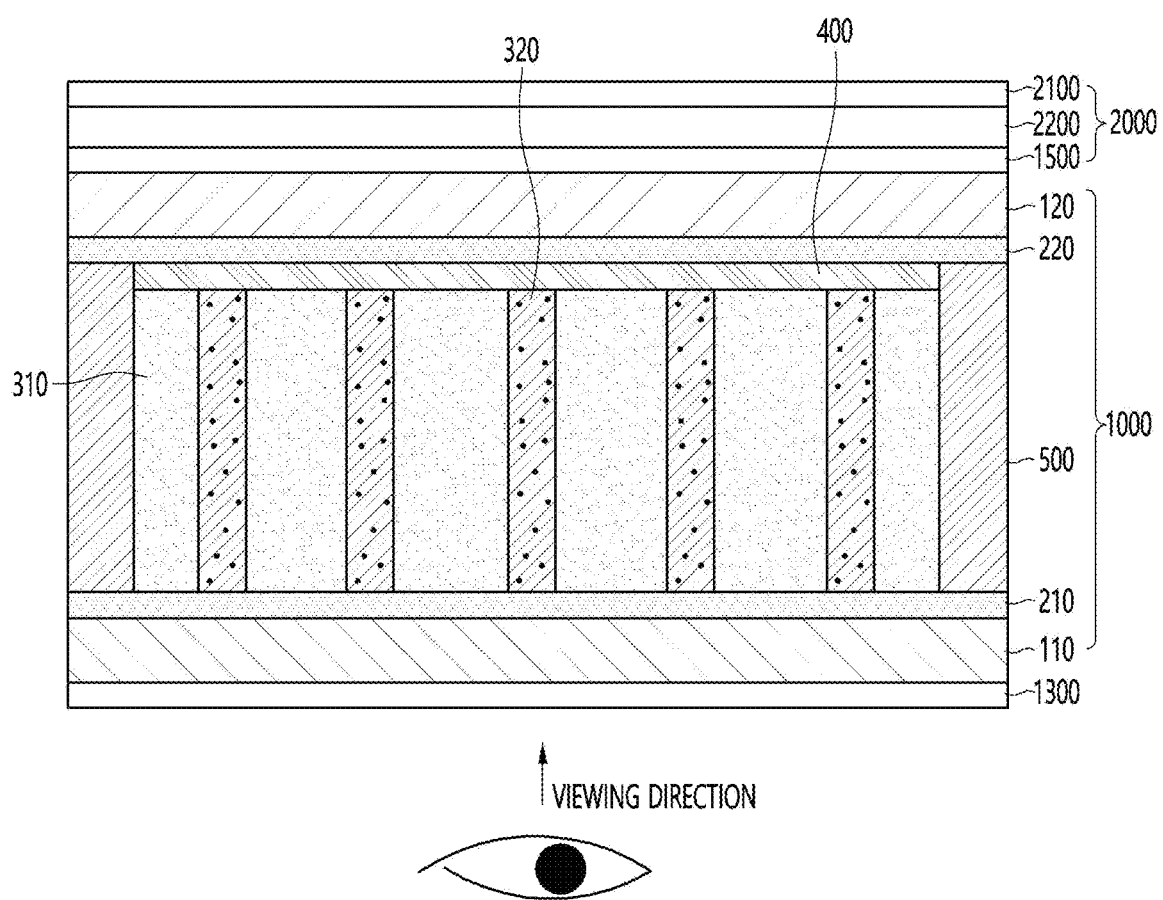
FIG. 19 is a view showing a cross-sectional view of a display device to which an optical path control member according to an embodiment is applied.

Referring to FIG. 19, an optical path control member 1000 according to an embodiment may be disposed on a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the optical path control member and the display panel, the optical path control member and the display panel may be adhered after the release film is removed.

The display panel 2000 may include a first substrate 2100 and a second substrate 2200. When the display panel 2000 is a liquid crystal display panel, the display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at a first substrate 2100 and a second substrate 2200 is bonded to the first substrate 2100 with a liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, a black electrolyte 320 may be omitted, and a common electrode may be formed to function as the black matrix.

In addition, when the display panel 2000 is a liquid crystal display panel, the display device may further include a backlight unit providing light from a rear surface of the display panel 2000.

Alternatively, when the display panel 2000 is an organic electroluminescence display panel, the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, a second substrate 2200 configured to function as an encapsulation substrate for encapsulation may further be included on the organic light emitting element.

Furthermore, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is an organic electroluminescence display panel, the polarizing plate may be the external light reflection preventive polarizing plate.

In addition, an additional functional layer 1300 such as an anti-reflection layer, an anti-glare, or the like may be further disposed on the optical path control member 1000. Specifically, the functional layer 1300 may be adhered to one surface of the base substrate 100 of the optical path control member. Although not shown in drawings, the functional layer 1300 may be adhered to the base 100 of the optical path control member via an adhesive layer. In addition, a release film for protecting the functional layer may be further disposed on the functional layer 1300.

Further, a touch panel may be further disposed between the display panel and the optical path control member.

Although it is shown in the drawings that the optical path control member is disposed at an upper portion of the display panel, but the embodiment is not limited thereto, and the optical path control member may be disposed at various positions such as a position in which light is adjustable, that is, a lower portion of the display panel, between an upper substrate and a lower substrate of the display panel, or the like.

Figure 20:
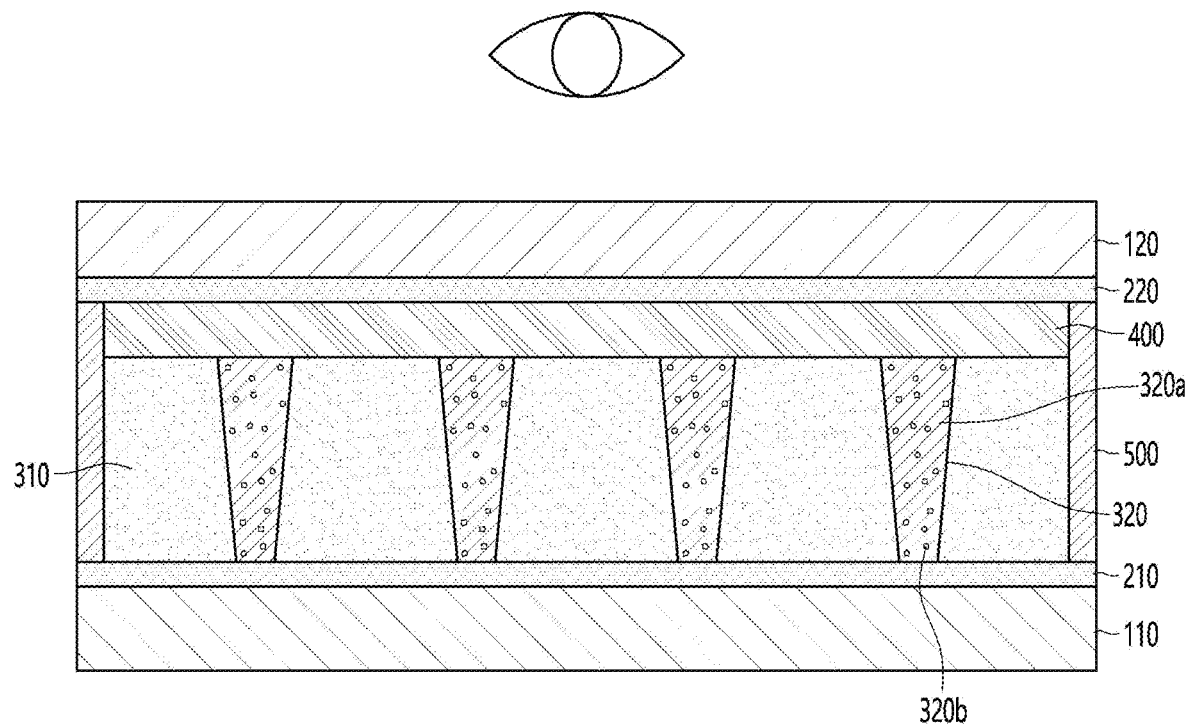
FIGS. 20 and 21 are views for describing one embodiment of a display device to which an optical path control member according to an embodiment is applied.
Figure 20:
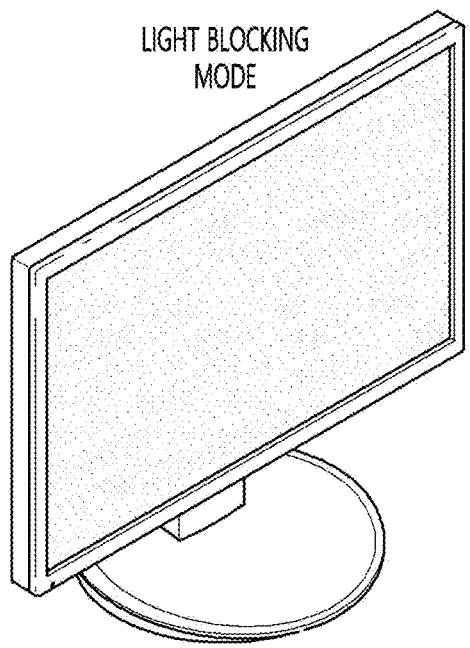
Figure 21:
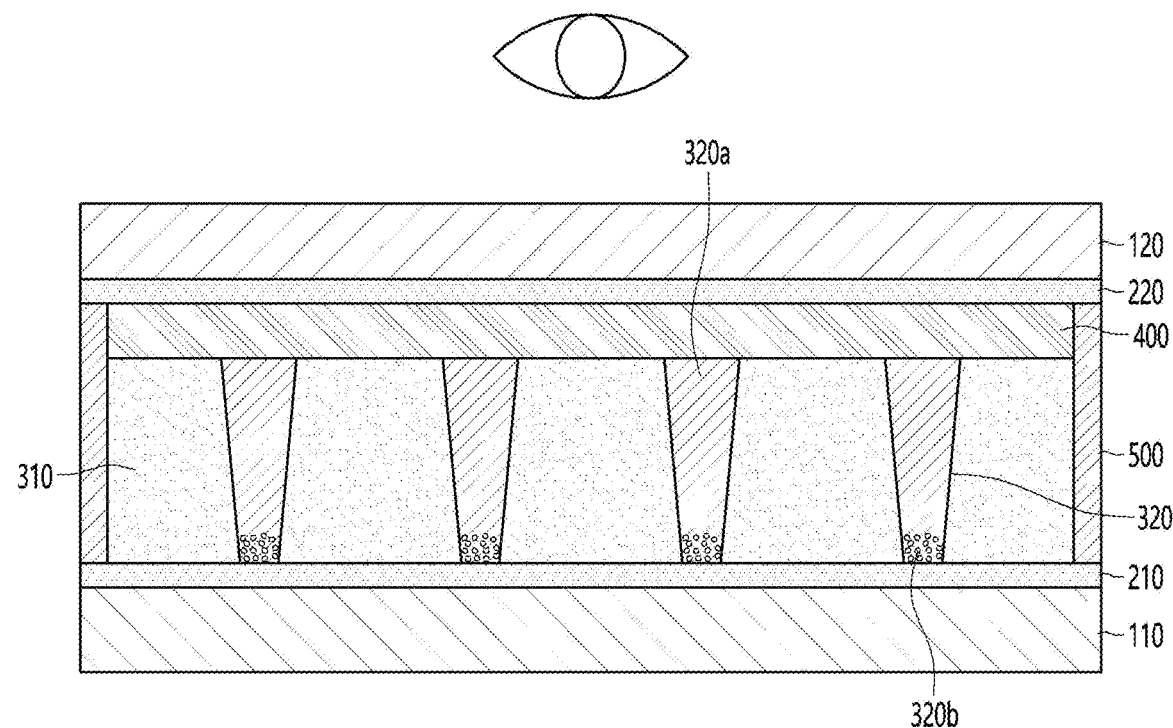
Figure 21:
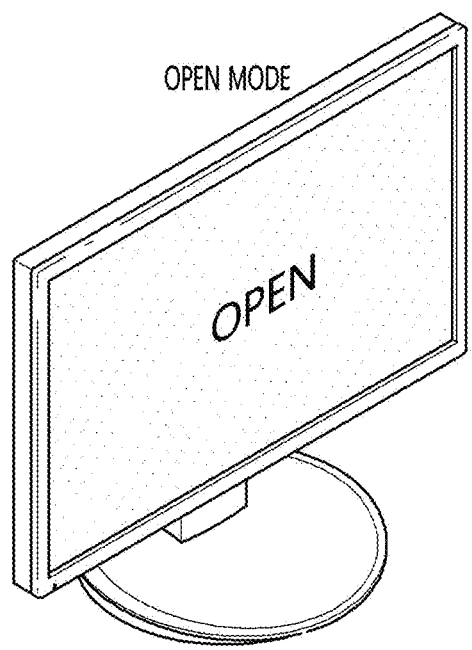

Referring to FIGS. 20 and 21, an optical path control member according to an embodiment may be applied to a display device that displays a display.

For example, when power is not applied to the optical path control member as shown in FIG. 20, the accommodation part functions as the light blocking part, so that the display device is driven in a light blocking mode, and when power is applied to the optical path control member as shown in FIG. 21, the accommodation part functions as the light transmitting part, so that the display device may be driven in an open mode.

Accordingly, a user may easily drive the display device in a privacy mode or a normal mode according to application of power.

In addition, although not shown in the drawings, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Furthermore, the optical path control member according to the embodiment may be applied to a windshield of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
   a lower substrate;
   a lower electrode disposed on an upper surface of the lower substrate;
   an upper substrate disposed on the lower substrate;
   an upper electrode disposed on a lower surface of the upper substrate;
   a light conversion unit disposed between the lower electrode and the upper electrode; and
   an adhesive layer between the light conversion unit and the upper electrode,
   wherein the light conversion unit includes a partition wall part and an accommodation part alternately disposed, and
   when a ratio of a thickness and a dielectric constant (thickness/dielectric constant) of the accommodation part is defined as A, and a ratio of a thickness and a dielectric constant (thickness/dielectric constant) of the adhesive layer is defined as B,
   the value of A is greater than the value of B,
   the thickness of the adhesive layer is smaller than the thickness of the accommodation part, and
   the dielectric constant of the adhesive layer is greater than the dielectric constant of the accommodation part.

2. The optical path control member of claim 1, wherein the value of A is 5 or more times with respect to the value of B.

3. The optical path control member of claim 1, wherein the dielectric constant (F/m) of the adhesive layer is 2 to 9, and
the dielectric constant (F/m) of the accommodation part is 2 to 4.

4. The optical path control member of claim 3, wherein the thickness of the adhesive layer is 5 μm to 100 μm, and
the thickness of the accommodation part is 80 μm to 120 μm.

5. The optical path control member of claim 1, wherein A has a value of $20*10^{-6}$ to $60*10^{-6}$,
B has a value of $1*10^{-6}$ to $50*10^{-6}$, and
the value of A is 5 times or more with respect to the value of B within the range.

6. The optical path control member of claim 1, wherein the adhesive layer has a transmittance of 85% or more, a haze of 1.0 or less, and a chromaticity index (b*) of 0.2 or less.

7. The optical path control member of claim 1, wherein a volume resistance of the adhesive layer is $10^7$ Ωcm to $10^{12}$ Ωcm.

8. A display device comprising:
a display panel; and
an optical path control member disposed on the display panel,
wherein the optical path control member comprises:
a lower substrate;
a lower electrode disposed on an upper surface of the lower substrate;
an upper substrate disposed on the lower substrate;
an upper electrode disposed on a lower surface of the upper substrate;
a light conversion unit disposed between the lower electrode and the upper electrode; and
an adhesive layer between the light conversion unit and the upper electrode,
wherein the light conversion unit includes a partition wall part and an accommodation part alternately disposed, and
when a ratio of a thickness and a dielectric constant (thickness/dielectric constant) of the accommodation part is defined as A, and a ratio of a thickness and a dielectric constant (thickness/dielectric constant) of the adhesive layer is defined as B,
the value of A is greater than the value of B,
the thickness of the adhesive layer is smaller than the thickness of the receiving portion, and
the dielectric constant of the adhesive layer is greater than the dielectric constant of the accommodation part.

9. The display device of claim 8, wherein A has a value of $20*10^{-6}$ to $60*10^{-6}$,
B has a value of $1*10^{-6}$ to $50*10^{-6}$, and
the value of A is 5 times or more with respect to the value of B within the range.

10. The optical path control member of claim 1, wherein when the accommodation part includes an electrolyte and light absorbing particles dispersed in the electrolyte,
the light transmittance of the accommodation part changes by the light absorbing particles.

11. The optical path control member of claim 1, wherein a width of the partition wall part is greater than a width of the accommodation part.

12. The optical path control member of claim 1, wherein the partition wall part includes a light-transmitting material.

13. The optical path control member of claim 1, wherein the accommodation part is changed to a first mode and a second mode by the application of voltage, and
the accommodation part blocks light in the first mode and transmits light in the second mode.

14. The display device of claim 8, wherein the dielectric constant (F/m) of the adhesive layer is 2 to 9, and
the dielectric constant (F/m) of the accommodation part is 2 to 4.

15. The display device of claim 8, wherein the thickness of the adhesive layer is 5 μm to 100 μm, and
the thickness of the accommodation part is 80 μm to 120 μm.

16. The display device of claim 8, wherein a volume resistance of the adhesive layer is $10^7$ Ωcm to $10^{12}$ Ωcm.

17. The display device of claim 8, wherein the display panel includes a liquid crystal display panel or an organic light-emitting display panel.

\* \* \* \* \*